United States Patent
Chen et al.

(10) Patent No.: US 8,970,175 B2
(45) Date of Patent: Mar. 3, 2015

(54) CHARGING CIRCUIT EMPLOYING A SOUTHBRIDGE MICROCHIP TO CONTROL CHARGING WHEN THE ELECTRONIC APPARATUS IS SHUT DOWN

(75) Inventors: Chun-Sheng Chen, New Taipei (TW); Hua Zou, Shenzhen (CN); Feng-Long He, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 396 days.

(21) Appl. No.: 13/216,264

(22) Filed: Aug. 24, 2011

(65) Prior Publication Data
US 2012/0306456 A1    Dec. 6, 2012

(30) Foreign Application Priority Data
Jun. 3, 2011    (CN) .......................... 2011 1 0149079

(51) Int. Cl.
*H02J 7/00*    (2006.01)
*G06F 1/26*    (2006.01)

(52) U.S. Cl.
CPC ............... *G06F 1/266* (2013.01); *H02J 7/0052* (2013.01); *H02J 2007/0062* (2013.01)
USPC ....................................................... 320/137

(58) Field of Classification Search
USPC .................................. 320/136, 107, 111, 137
See application file for complete search history.

(56) References Cited

U.S. PATENT DOCUMENTS

| | | | | |
|---|---|---|---|---|
| 6,072,250 A * | 6/2000 | Thandiwe et al. | ............ | 307/150 |
| 7,853,815 B2 * | 12/2010 | Tsai et al. | ..................... | 713/323 |
| 7,899,397 B2 * | 3/2011 | Kumar | ......................... | 455/41.2 |
| 7,987,376 B2 * | 7/2011 | Inoue et al. | ................... | 713/300 |
| 8,055,919 B2 * | 11/2011 | Magnusson | .................. | 713/300 |
| 8,195,863 B2 * | 6/2012 | Uchida | ......................... | 710/313 |
| 8,237,414 B1 * | 8/2012 | Li et al. | ......................... | 320/160 |
| 8,407,495 B2 * | 3/2013 | Inoue et al. | ................... | 713/300 |
| 2006/0035527 A1 * | 2/2006 | Numano | ....................... | 439/668 |
| 2007/0220290 A1 * | 9/2007 | Tsai et al. | ..................... | 713/300 |
| 2009/0160404 A1 * | 6/2009 | Iwai | ............................. | 320/138 |
| 2010/0161869 A1 * | 6/2010 | Uchida | ......................... | 710/313 |
| 2010/0194348 A1 * | 8/2010 | Wang et al. | .................. | 320/136 |
| 2010/0205463 A1 * | 8/2010 | Magnusson | .................. | 713/300 |
| 2011/0291609 A1 * | 12/2011 | Bae | .............................. | 320/103 |
| 2013/0154551 A1 * | 6/2013 | Jeansonne et al. | ........... | 320/107 |

* cited by examiner

*Primary Examiner* — Yalkew Fantu
*Assistant Examiner* — Manuel Hernandez
(74) *Attorney, Agent, or Firm* — Novak Druce Connolly Bove + Quigg LLP

(57) ABSTRACT

A charging circuit employed in an electronic apparatus is operable to charge a portable electronic device. The charging circuit includes a charging control microchip including two control terminals, a southbridge microchip, a logic control circuit, and a basic input/output system (BIOS). The southbridge microchip and the BIOS are both electronically connected to the logic control circuit to control the logic control circuit to set or reset voltage of the two control terminals, then the charging control microchip is switched to a charging mode or a data transmission mode according to the voltage of the two control terminals.

11 Claims, 3 Drawing Sheets

CHARGING CIRCUIT EMPLOYING A SOUTHBRIDGE MICROCHIP TO CONTROL CHARGING WHEN THE ELECTRONIC APPARATUS IS SHUT DOWN

BACKGROUND

1. Technical Field

The disclosure generally relates to charge circuits, and more particularly relates to a charging circuit using universal serial bus (USB) interface sleep technology.

2. Description of the Related Art

When the voltage of a battery of a portable electronic device, such as a mobile phone is insufficient, the battery can be charged via connecting the portable electronic device to a USB interface of a personal computer which implements USB interface sleep technology.

Referring to FIG. 3, a USB charging control system 1 used in a personal computer that implements the USB interface sleep technology often includes a charging control microchip 2, a USB transceiver 3, a southbridge microchip 4, and a USB connector 5. Control terminals S0 and S1 of the charging microchip 2 are operable to control data terminals D+ and D− of the charging control microchip 2. When the control terminals S0 and S1 are both set to logic 0, the USB charging control system 1 can be in a charging mode, and then the portable electronic device is electronically connected to the two data terminals D+ and D− via the USB connector 5, to obtain power from the charging control microchip 2. When the control terminals S0 and S1 are both set to logic 1, the data terminals D+ and D− are respectively connected to transmission terminals Y+ and Y− of the charging control microchip 2, then the USB charging control system 1 can be in a data transmission mode, and the portable electronic device can receive data from the personal computer via the USB connector 5, the USB transceiver 3, and the southbridge microchip 4.

However, it is a defect in the USB charging control system 1 that the portable electronic device can not obtain power from the personal computer before the operating system of the personal computer has been started. Furthermore, the charging mode and the data transmission mode are not interchangeable when the personal computer is in a sleep mode. Thus, inconvenience is caused.

Therefore, there is room for improvement within the art.

BRIEF DESCRIPTION OF THE DRAWINGS

Many aspects of an exemplary charging circuit can be better understood with reference to the following drawings. The components in the drawings are not necessarily drawn to scale, the emphasis instead being placed upon clearly illustrating the principles of the exemplary charging circuit. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
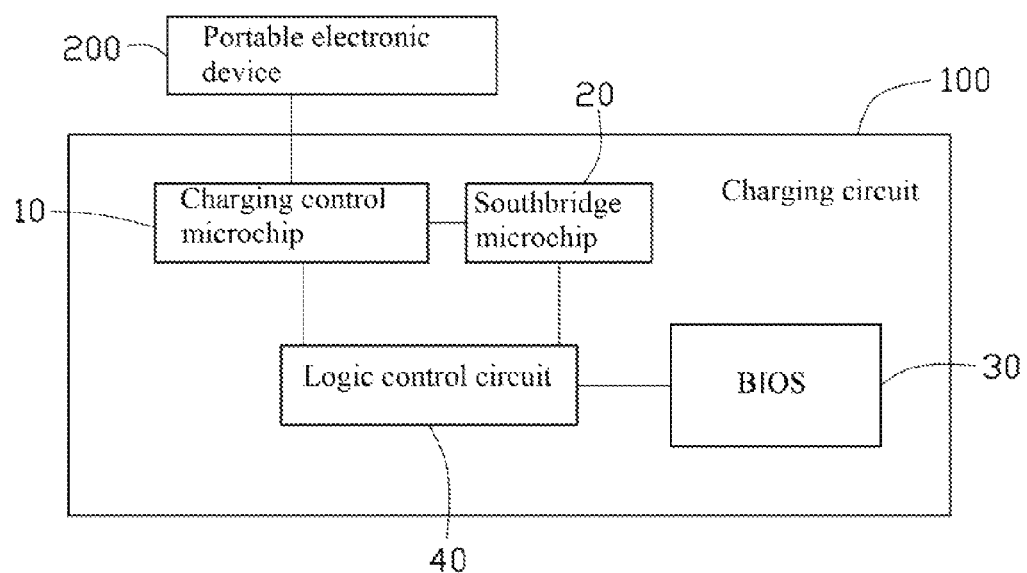
FIG. 1 is a block diagram of a charging circuit comprising a logic control circuit, according to an exemplary embodiment.

FIG. 1 shows a charging circuit 100 comprising a logic control circuit 40, according to an exemplary embodiment. The charging circuit 100 can be employed in a personal computer or other electronic apparatus and is capable of charging a battery of a portable electronic device 200 through a USB cable. The charging circuit 100 further includes a charging control microchip 10, a southbridge microchip 20, and a basic input/output system (BIOS) 30.

Figure 2:
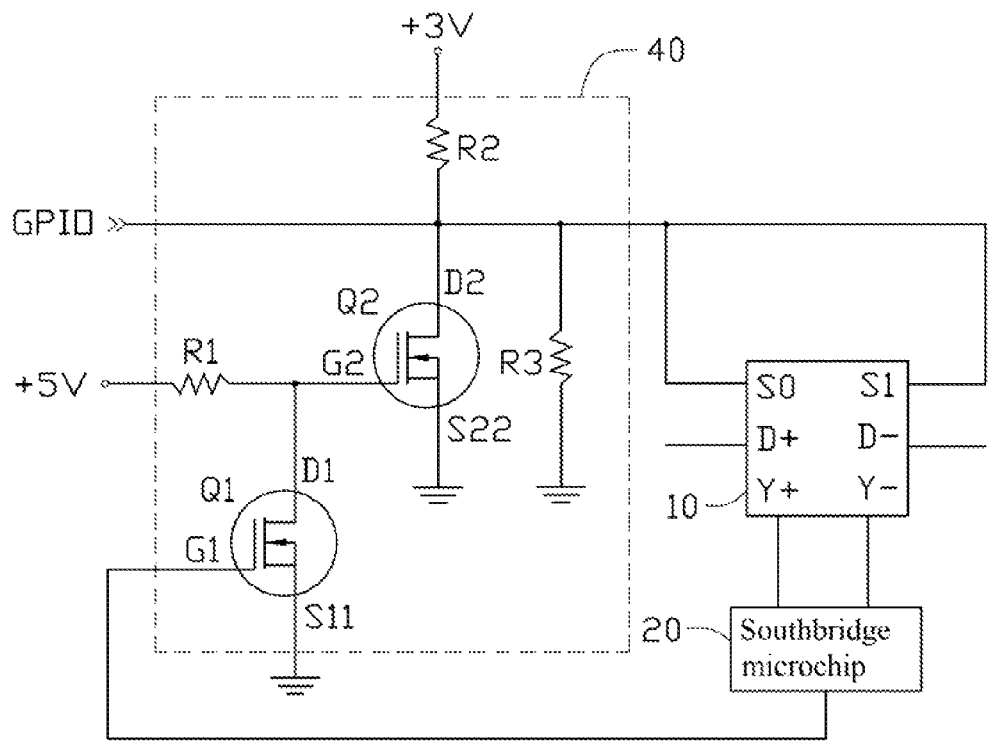
FIG. 2 is a circuit view of one embodiment of the logic control circuit of FIG. 1.
Figure 3:
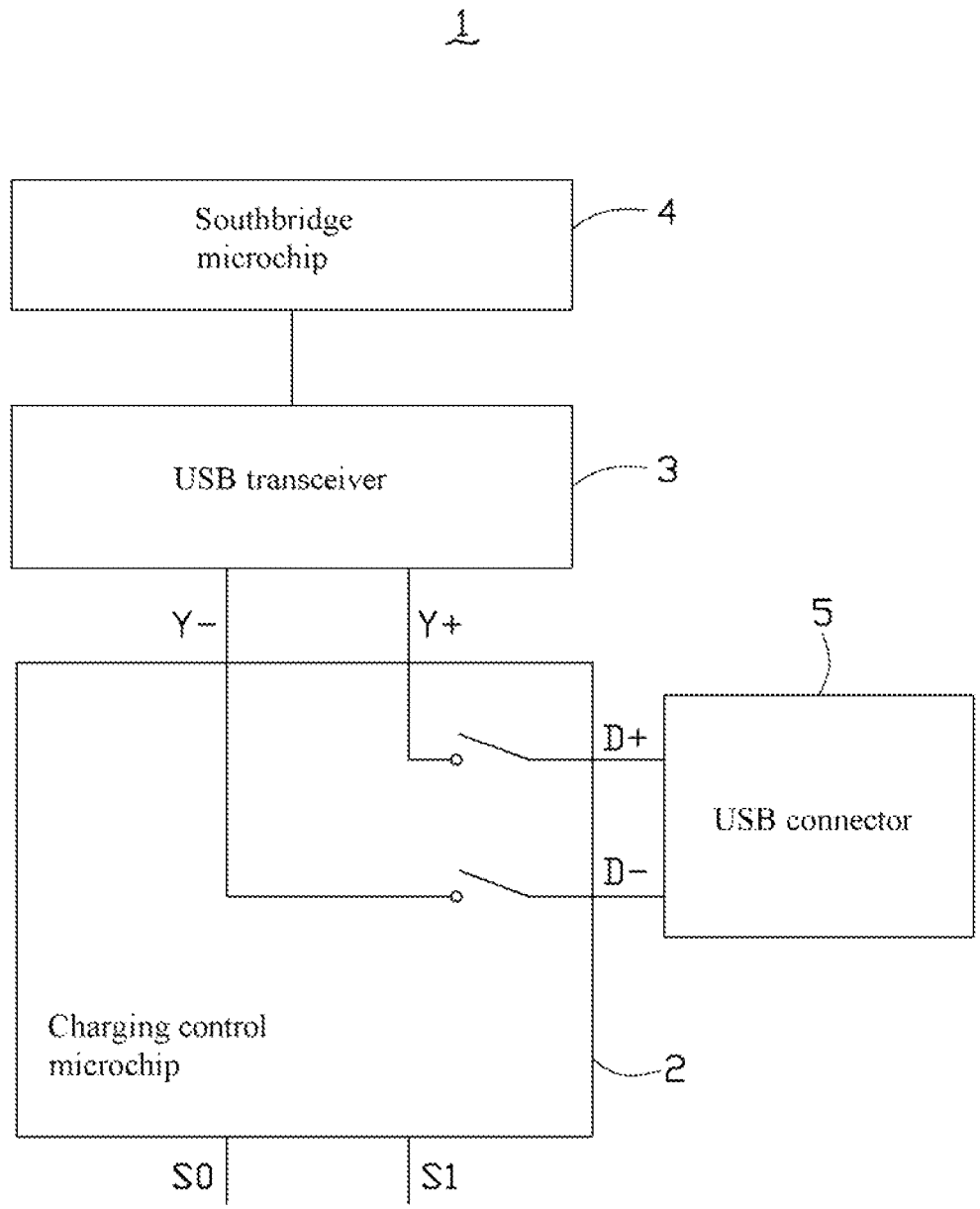
FIG. 3 is a block diagram of a conventional USB charging control system.

Also referring to FIG. 2, the charging control microchip 10 can be a traditional charging control microchip same as prior art and includes data terminals D+ and D−, transmission terminals Y+ and Y−, and control terminals S0 and S1. The data terminals D+ and D− are electronically connected to the portable electronic device 200 via a USB connector (not shown). The transmission terminals Y+ and Y− are electronically connected to the southbridge microchip 20, and the control terminal S0 connects to the control terminal S1. When the control terminals S0 and S1 are both set to logic 0, the charging control microchip 10 can be in a charging mode, and then the portable electronic device 200 can obtain power from the charging control microchip 10. When the control terminals S0 and S1 are both set to logic 1, the data terminals D+ and D− are respectively connected to the transmission terminals Y+ and Y−, then the charging control microchip 10 can be in a data transmission mode, and the portable electronic device 200 is electronically connected to the southbridge microchip 20 via the charging control microchip 10. Thus, the portable electronic device 200 can exchange data with the personal computer.

The southbridge microchip 20 is electronically connected to the logic control circuit 40 to output different control signals to the logic control circuit 40 at different times. Specifically, when the personal computer is powered on (represented as a T0 period), the southbridge microchip 20 outputs a power level control signal, which is logic 0. When the personal computer is under the control of the operating system (represented as a T1 period), the power level control signal changes to logic 1. When the personal computer enters a sleep mode (represented as a T3 period), the power level control signal maintains the logic 1 signal. When the personal computer is in a deep sleep mode (represented as a T4 period) or the personal computer is powered off (represented as a T5 period), the power level control signal changes to logic 0.

The BIOS 30 is electronically connected to the logic control circuit 40 via a general purpose input/output (GPIO) interface. The BIOS 30 is operable to output a GPIO control signal to the logic control circuit 40 when the personal computer is in the sleep mode (the T3 period). The GPIO control signal can be predetermined as logic 0 or logic 1.

The logic control circuit 40 is directed by the southbridge microchip 20 and the BIOS 30 and is operable to set or reset the control terminals S0 and S1. The logic control circuit 40 includes a first metal oxide semiconductor field effect transistor (MOSFET) Q1, a second MOSFET Q2, a first resistor R1, a second resistor R2, and a third resistor R3. The first MOSFET Q1 includes a gate G1, a source S11, and a drain D1. The gate G1 is electronically connected to the southbridge microchip 20 to receive the power level control signals. The source S11 is connected to ground, and the drain D1 is electronically connected to a power supply of about 5V through the first resistor R1. The second MOSFET Q2 includes a gate G2, a source S22, and a drain D2. The gate G2 of the second MOSFET Q2 is connected to the drain D1 of the first MOSFET Q1, the source S22 is connected to ground, and the drain D2 is electronically connected to the BIOS 30 via the GPIO interface to receive the GPIO control signal. Additionally, the drain D2 is electronically connected to a power supply of about 3V through the second resistor R2 and is also electronically connected to the control terminals S0 and S1 of the charging control microchip 10. One end of the third resistor R3 is connected between the drain D2 and the control terminal S0, and the other end is connected to ground.

The working principle of the charging circuit 100 will be illustrated here according to the T0, T1, and T3-T5 periods.

When the personal computer is powered on (the T0 period), the southbridge microchip 20 outputs a power level control signal with logic 0 to the gate G1 of the first MOSFET Q1. Then, the first MOSFET Q1 is cut off, and the second MOSFET Q2 is turned on to pull down the voltage of the drain D2. Then the control terminals S0 and S1 are both set to logic 0, thus, the charging control microchip 10 enters the charging mode to charge the portable electronic device 200. Even though the operating system of the personal computer has not yet been started, the charging circuit 100 can also charge the portable electronic device 200 as long as the personal computer receives an alternating current.

When the personal computer is under the control of the operating system (the T1 period), the southbridge microchip 20 outputs a power level control signal with logic 1 to the gate G1 of the first MOSFET Q1. Then, the first MOSFET Q1 is turned on, the second MOSFET Q2 is cut off, and the voltage of the drain D2 is not pulled down. Then the control terminals S0 and S1 are both set to logic 1, thus, the charging control microchip 10 enters the data transmission mode, and the portable electronic device 200 can send data to the personal computer, or receive data from the personal computer, via the transmission terminals Y+ and Y− of the charging control microchip 10 and the southbridge microchip 20. Additionally, the charging circuit 100 continues to charge the portable electronic device 200 because a motherboard (not shown) of the personal computer is running in this period.

When the personal computer enters the sleep mode (the T3 period), the power level control signal maintains the logic 1 signal, and the second MOSFET Q2 is cut off. Then, if the GPIO control signal sent by the BIOS 30 is logic 0, the control terminals S0 and S1 are both set to logic 0, and the charging control microchip 10 enters the charging mode to charge the portable electronic device 200. If the GPIO control signal is logic 1, the control terminals S0 and S1 are both set to logic 1, and the charging control microchip 10 enters the data transmission mode. In the data transmission mode, the charging circuit 100 can not charge the portable electronic device 200 because the motherboard of the personal computer is not running in the sleep mode. However, users can reset the GPIO control signal to change the mode, from data transmission to charging mode, to ensure that the portable electronic device 200 receives power from the personal computer.

When the personal computer is in the deep sleep mode (the T4 period), the power level control signal changes to logic 0, and the second MOSFET Q2 is turned on. Then the control terminals S0 and S1 are both set to logic 0, and the charging control microchip 10 enters the charging mode to charge the portable electronic device 200.

When the personal computer is shut down (the T5 period), the power level control signal maintains the logic 0 signal, and the charging circuit 100 continues to charge the portable electronic device 200 as long as the personal computer continues receiving an alternating current.

The logic control circuit 40 and the BIOS 30 can control the control terminals S0 and S1 of the charging control microchip 10, so that the charging control microchip 10 can be in a charging mode or in a data transmission mode. The charging circuit 100 can charge the portable electronic device 200 so long as the personal computer is receiving an alternating current. Additionally, when the personal computer is in the sleep mode, users can reset the GPIO control signal to change charging mode for data transmission mode and vice versa, thus, the charging circuit 100 is convenient and efficient.

Although numerous characteristics and advantages of the exemplary disclosure have been set forth in the foregoing description, together with details of the structure and function of the exemplary disclosure, the disclosure is illustrative only, and changes may be made in detail, especially in the matters of shape, size, and arrangement of parts within the principles of exemplary disclosure to the full extent indicated by the broad general meaning of the terms in which the appended claims are expressed.

What is claimed is:

1. A charging circuit employed in an electronic apparatus for charging a battery of a portable electronic device, comprising:

a charging control microchip including two control terminals;

a logic control circuit electronically connected to the two control terminals;

a southbridge microchip electronically connected to the charging control microchip and the logic control circuit to output different power level control signals to the logic control circuit at different times; and a basic input/output system (BIOS) electronically connected to the logic control circuit;

wherein the southbridge microchip and the BIOS both control the logic control circuit to output voltage signals to set or reset voltage of the two control terminals, the charging control microchip is switched to a charging mode or a data transmission mode according to the voltage of the two control terminals; when the electronic apparatus is shut down, the southbridge microchip outputs the power level control signal to the logic control circuit, thereby letting the charging control microchip continually charge the battery of the portable electronic device;

the logic control circuit includes a first metal oxide semiconductor field effect transistor (MOSFET) and a second MOSFET, a gate of the first MOSFET is directly connected to the southbridge microchip, a source of the first MOSFET is directly connected to ground, a drain of the first MOSFET is directly connected to a gate of the second MOSFET, a source of the second MOSFET is directly connected to ground, a drain of the second MOSFET is directly connected to the BIOS and the two control terminals;

the southbridge microchip is operable to output the power level control signal to the gate of the first MOSFET, and the BIOS is operable to output a general purpose input/output (GPIO) control signal to the drain of the second MOSFET;

the power level control signal is logic 1 in response to a sleep mode state of the electronic apparatus;

when the GPIO control signal is logic 1, the two control terminals are both set to logic 1, the charging control microchip is switched to the data transmission mode to exchange data with the portable electronic device.

2. The charging circuit as claimed in claim 1, wherein the logic control circuit further includes a first resistor connected between a power supply and the drain of the first MOSFET.

3. The charging circuit as claimed in claim 1, wherein the logic control circuit further includes a second resistor connected between a power supply and the drain of the second MOSFET.

4. The charging circuit as claimed in claim 1, wherein when the GPIO control signal is logic 0, the two control terminals are both set to logic 0, the charging control microchip is switched to the charging mode to charge the portable electronic device.

5. The charging circuit as claimed in claim 1, wherein when the electronic apparatus is in the sleep mode, the first MOSFET is turned on, and the second MOSFET is cut off.

6. The charging circuit as claimed in claim 1, wherein when the electronic apparatus is powered on, the power level control signal is logic 0, and the two control terminals are both set to logic 0.

7. The charging circuit as claimed in claim 1, wherein the BIOS is electronically connected to the drain of the second MOSFET via a GPIO interface.

8. The charging circuit as claimed in claim 1, wherein the charging control microchip further includes two data terminals and two transmission terminals, the two data terminals are electronically connected to the portable electronic device, and the two transmission terminals are electronically connected to the southbridge microchip.

9. The charging circuit as claimed in claim 8, wherein when the two control terminals are both set to logic 0, the two data terminals are respectively connected to the two transmission terminals so that the portable electronic device can exchange data with the electronic apparatus through the southbridge microchip.

10. A charging circuit employed in an electronic apparatus for charging a battery of a portable electronic device, comprising:
  a charging control microchip including two control terminals;
  a southbridge microchip electronically connected to the charging control microchip;
  a basic input/output system (BIOS); and
  a logic control circuit comprising a first metal oxide semiconductor field effect transistor (MOSFET) and a second MOSFET;

wherein a gate of the first MOSFET is directly connected to the southbridge microchip, a source of the first MOSFET is directly connected to ground, a drain of the first MOSFET is directly connected to a gate of the second MOSFET, a source of the second MOSFET is directly connected to ground, a drain of the second MOSFET is directly connected to the BIOS and the two control terminals; and wherein the southbridge microchip outputs a power level control signal to the gate of the first MOSFET, and the BIOS outputs a general purpose input/output (GPIO) control signal to the drain of the second MOSFET, the logic control circuit sets or resets voltage of the two control terminals according to the power level control signal and the GPIO control signal, the charging control microchip is switched to a charging mode or a data transmission mode according to the voltage of the two control terminals; the southbridge microchip outputs different power level control signals to the logic control circuit at different times; when the electronic apparatus is shut down, the southbridge microchip outputs the power level control signal to the logic control circuit, thereby letting the charging control microchip continually charge the battery of the portable electronic device;

the power level control signal is logic 1 in response to a sleep mode state of the electronic apparatus;

when the GPIO control signal is logic 1, the two control terminals are both set to logic 1, the charging control microchip is switched to the data transmission mode to exchange data with the portable electronic device.

11. The charging circuit as claimed in claim 10, wherein when the GPIO control signal is logic 0, the two control terminals are both set to logic 0, the charging control microchip is switched to the charging mode to charge the portable electronic device.

* * * * *